(12) United States Patent
Strauss et al.

(10) Patent No.: US 9,683,494 B2
(45) Date of Patent: Jun. 20, 2017

(54) METHOD AND DEVICE FOR OPERATING A MOTOR VEHICLE

(71) Applicant: Robert Bosch GmbH, Stuttgart (DE)

(72) Inventors: Steffen Strauss, Rutesheim (DE); Nikolas Poertner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 153 days.

(21) Appl. No.: 14/639,623

(22) Filed: Mar. 5, 2015

(65) Prior Publication Data

US 2015/0252739 A1   Sep. 10, 2015

(30) Foreign Application Priority Data

Mar. 6, 2014   (DE) .................. 10 2014 204 083

(51) Int. Cl.
| | |
|---|---|
| *F02D 29/02* | (2006.01) |
| *B60W 30/188* | (2012.01) |
| *F02D 41/22* | (2006.01) |
| *F02N 11/08* | (2006.01) |

(52) U.S. Cl.
CPC ......... *F02D 29/02* (2013.01); *B60W 30/1882* (2013.01); *F02D 41/22* (2013.01); *F02D 2250/24* (2013.01); *F02N 11/0829* (2013.01); *Y02T 10/40* (2013.01)

(58) Field of Classification Search
CPC .... F02D 29/02; B60W 10/06; B60W 30/1882
See application file for complete search history.

(56) References Cited

U.S. PATENT DOCUMENTS

| | | | | |
|---|---|---|---|---|
| 6,209,315 | B1 * | 4/2001 | Weigl ................ | B01D 53/9431 60/274 |
| 6,947,830 | B1 * | 9/2005 | Froloff .................. | F02D 35/023 701/111 |
| 7,110,869 | B2 * | 9/2006 | Tao .......................... | F16H 59/38 180/65.6 |
| 8,364,339 | B2 * | 1/2013 | Willard .................. | G07C 5/085 701/31.4 |
| 2004/0267395 | A1 * | 12/2004 | Discenzo ............. | G05B 13/024 700/99 |
| 2007/0199553 | A1 * | 8/2007 | Thiel .................... | F02D 41/1402 123/690 |
| 2009/0204267 | A1 * | 8/2009 | Sustaeta ............. | G05B 13/0285 700/291 |
| 2011/0040433 | A1 * | 2/2011 | Steuernagel ............. | B60K 6/48 701/22 |
| 2012/0150406 | A1 * | 6/2012 | Tomura ................. | B60W 10/06 701/70 |

(Continued)

FOREIGN PATENT DOCUMENTS

| | | |
|---|---|---|
| DE | 103 02 058 | 7/2004 |
| DE | 10 2007 043 607 | 3/2009 |

(Continued)

*Primary Examiner* — Thomas Tarcza
*Assistant Examiner* — Alex C Dunn
(74) *Attorney, Agent, or Firm* — Gerard Messina

(57) ABSTRACT

A method is provided for carrying out a diagnosis of an internal combustion engine of a motor vehicle wherein, during the diagnosis, at least partially an additional drive machine, particularly an electric motor, generates a torque, and thereby changes an operating point of the internal combustion engine.

15 Claims, 2 Drawing Sheets

(56) References Cited

U.S. PATENT DOCUMENTS

2015/0088400 A1* 3/2015 Buhler ............... B60K 11/085
                                                        701/102
2016/0046284 A1* 2/2016 Inoue .................. B60K 6/48
                                                         701/22

FOREIGN PATENT DOCUMENTS

DE    10 2009 028 374    2/2011
DE         102012211024    1/2014

* cited by examiner

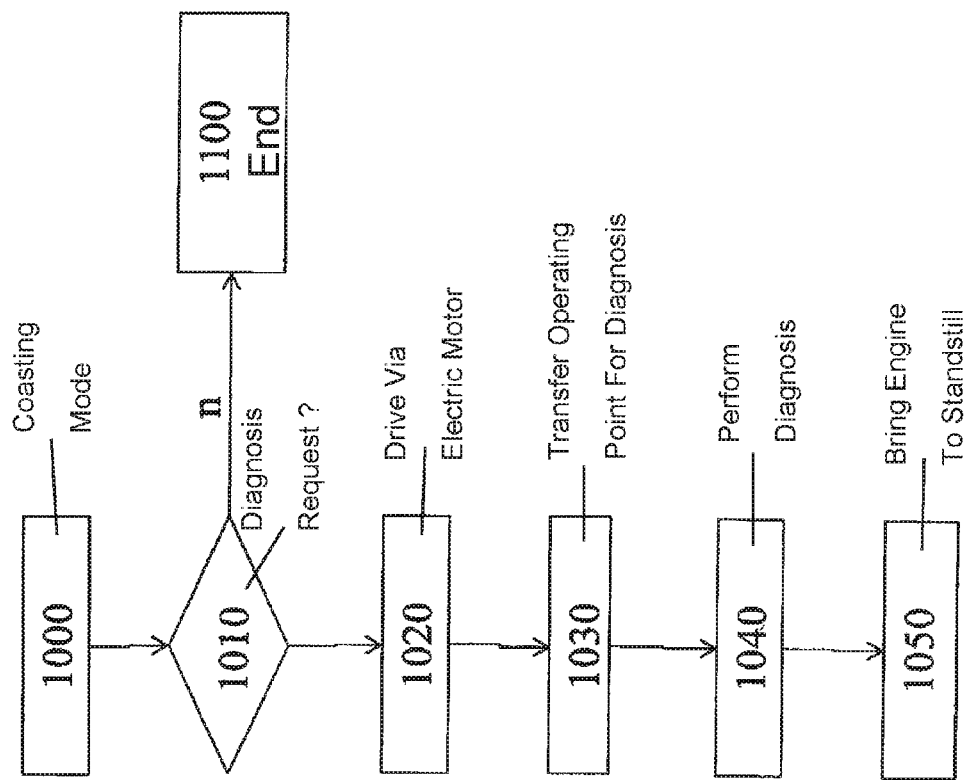

METHOD AND DEVICE FOR OPERATING A MOTOR VEHICLE

FIELD OF THE INVENTION

The invention relates to a method for operating a drive of a motor vehicle. In further aspects, the present invention relates to a computer program for carrying out this method, an electronic storage medium and a control unit as well as program code having instructions for generating the computer program.

BACKGROUND INFORMATION

A method for operating a vehicle is known from German Published Patent Application No. 10 2012 211 024, including the specifying of a setpoint power requirement over time for the vehicle on an internal combustion engine, the setpoint power requirement over time being a function of a diagnosis to be carried out on the internal combustion engine; and an accessory being connected to the internal combustion engine when an actual power requirement over time of the vehicle on the internal combustion engine deviates from the setpoint power requirement over time, and the actual power requirement over time of the internal combustion engine is estimated on a route to be driven with the vehicle, and the diagnosis is planned based on a probability that a difference between the actual power requirement over time and the setpoint power requirement over time is able to be compensated for by connecting the accessory to the internal combustion engine, and the diagnosis being prohibited if the probability falls below a predetermined threshold value.

SUMMARY

According to the present invention, it was found that, in a motor vehicle able to coast, such diagnoses are able to be carried out particularly advantageously during coasting phases of the motor vehicle.

In a method for carrying out a diagnosis of an internal combustion engine of a motor vehicle, if, during the diagnosis, at least partially an additional drive machine generates a torque, so that thereby an operating point of the internal combustion engine is changed, this has the advantage that the diagnosis is able to be carried out even if, based on route topology and/or the driving profile, it could otherwise not be carried out.

The additional drive machine in this case may be an electric motor, for example, but it may also be, for instance a pneumatic or hydraulic accessory.

In particular, it is conceivable, in this instance, that the additional drive machine is able to be driven by motor, and that the torque supports the rotational motion of the internal combustion engine.

According to a further embodiment, the diagnosis is carried out at least partially in a passive operation of the internal combustion engine, during the passive operation a mechanical coupling, for instance, a coupling of the internal combustion engine to wheels of the motor vehicle is opened, and the additional drive machine drives the internal combustion engine. The operating point of the internal combustion engine may thereby be set particularly flexibly.

In particular, it is possible in one specific embodiment that the internal combustion engine is operated in passive operation in such a way that it generates a drive torque not by the combustion of a fuel/air mixture. Such an operation is possible, for example, by disconnecting injection and/or ignition, but it is also possible that injection and/or ignition are switched on as long as no drive torque is generated.

According to one further aspect it may be provided that the additional drive machine changes the operating point of the internal combustion engine in such a way that the diagnosis is able to be carried out.

According to one further aspect, it may be provided that, during the diagnosis, air is supplied to the internal combustion engine, for instance, by opening a throttle valve.

Alternatively or in addition, it is possible that, during the diagnosis, fuel is injected into the internal combustion engine.

In particular, it is then also possible that, during the diagnosis, a fuel/air mixture is ignited in the internal combustion engine.

By this measure, the carrying out of the diagnosis may be supported.

In a further aspect, it may be provided that the internal combustion engine is brought to a standstill when the diagnosis is terminated. Alternatively, it may be provided that the internal combustion engine is transferred to an active mode when the diagnosis is terminated. This means that a fuel/air mixture in the internal combustion engine is ignited in such a way that a drive torque is generated, particularly that the internal combustion engine is running without support by the additional drive machine.

It may also be provided that the internal combustion engine is transferred to an active mode when a driver command is ascertained to start the internal combustion engine.

In particular, it may be provided, during the transferring of the internal combustion engine into the active mode, that a driving torque, generated by the additional drive machine, is reduced in such a way that a total torque, that is transmitted by the internal combustion engine and the additional drive machine, is constant. Because of this, switching into active mode becomes particularly comfortable.

In one further aspect, the present invention relates to program code together with processing instructions for generating a computer program able to run on a control unit, particularly source code with compiler and/or linking instructions, the program code yielding the computer program for carrying out all the steps of one of the methods described if it is converted according to the processing instructions into an executable computer program, that is, particularly compiled and/or linked. This program code may particularly be given by source code which is able to be downloaded from a server on the Internet, for example.

BRIEF DESCRIPTION OF THE DRAWINGS

FIG. 2 a flow chart according to a specific embodiment of the present invention.

DETAILED DESCRIPTION

Figure 1:
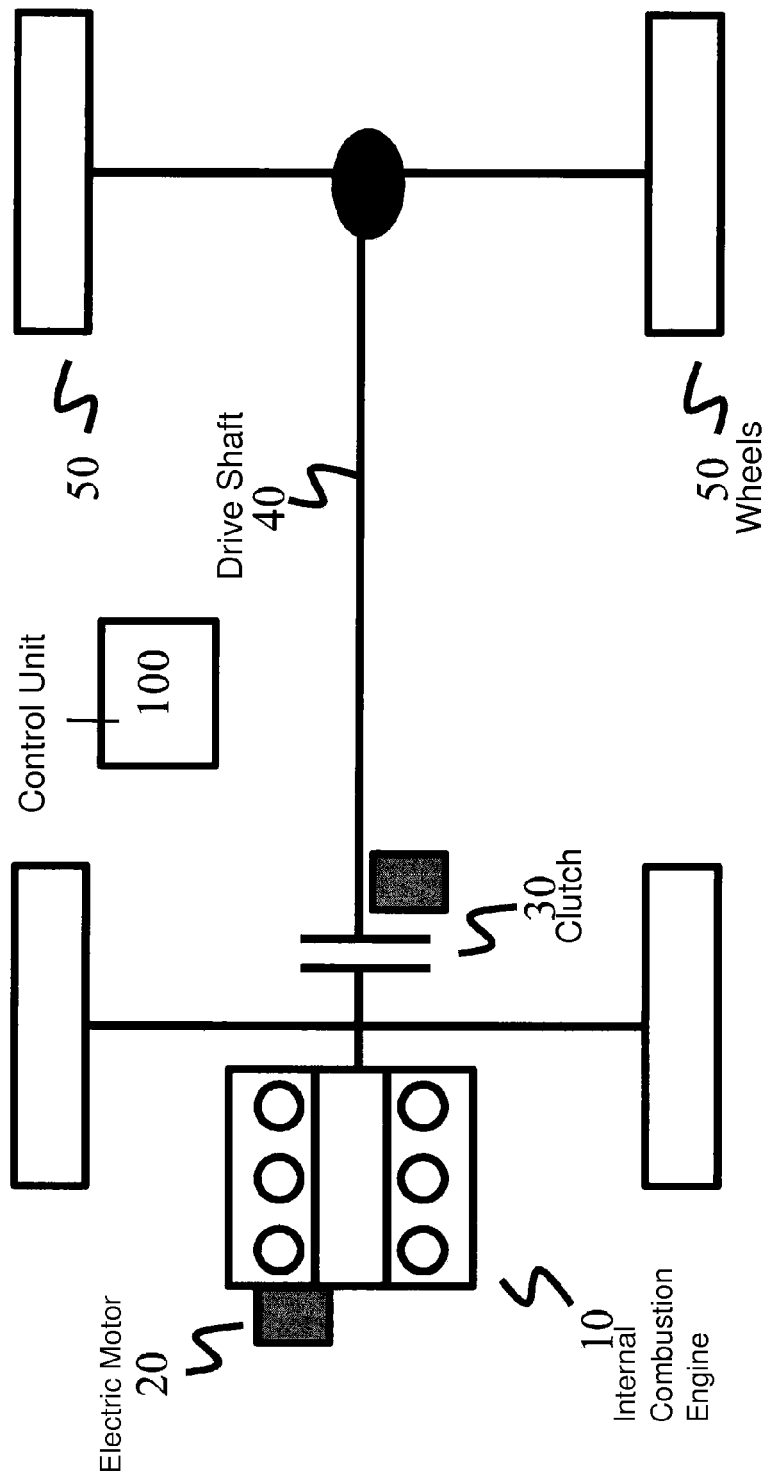
FIG. 1 schematically a design of a drive train of the motor vehicle.

FIG. 1 shows schematically the drive train of a motor vehicle. Internal combustion engine 10 is mechanically coupled via clutch 30 to drive shaft 40, which actuates the wheels 50. Internal combustion engine 10 and clutch 30 are actuated by control unit 100. Of course, it is also possible that internal combustion engine 10 and clutch 30 are actuated by separate control units.

In the exemplary embodiment, the additional drive machine is fulfilled by an electric motor 20, for instance, a belt-driven starter-generator.

FIG. 2 shows a flow chart of a possible specific embodiment of the present invention. In step 1000, the motor vehicle is in a coasting mode, i.e. clutch 30 is open and internal combustion engine 10 is shut down, or rather generates no driving torque. The introduction of coasting operation is generally known in the related art, and requires no further explanation.

In subsequent step 1010, it is checked whether there is a diagnosis request present. If this is not the case, the method ends with step 1100.

The query in step 1010 may also be limited to whether a diagnosis request is present which cannot be put off or which cannot be carried out at other operating points of internal combustion engine 10.

Otherwise, step 1020 follows, in which internal combustion engine 10 is driven by electric motor 20. Depending on the embodiment of electric motor 20, it may be necessary that a separating clutch be closed between electric motor 20 and internal combustion engine 10, and/or that a neutral gear be engaged.

Step 1030 follows optionally, in which internal combustion engine 10 is transferred into an operating point in which the diagnosis is able to be carried out. For example, it may also be provided, in this instance, that internal combustion engine 10 will be accelerated to a specified rotational speed so that injections and/or ignitions are dropped, or the like. In step 1040, the actual diagnosis is carried out.

In optional step 1050, after termination of the diagnosis, internal combustion engine 10 is brought to a standstill, i.e. electric motor 20 no longer drives internal combustion engine 10.

It is also possible, however, that internal combustion engine 10 is transferred into the active mode instead, i.e. electric motor 20 drives internal combustion engine 10 at least not by itself any more, but ignition and/or injection take care of generating a driving torque in internal combustion engine 10.

It is also possible that it is provided still in step 1040 that it is ascertained whether a driver command for starting internal combustion engine 10 is present. If this is the case, internal combustion engine 10 is also transferred into active mode.

The transfer of internal combustion engine 10 into active mode may take place in a manner neutral as to torque, as described above, if necessary having transient transitions.

What is claimed is:

1. A method for carrying out a diagnosis of an internal combustion engine of a motor vehicle, comprising:
    during the diagnosis, causing at least partially an additional drive machine to generate a torque, and thereby change an operating point of the internal combustion engine, wherein the internal combustion engine is brought to a standstill when the diagnosis is terminated.

2. The method as recited in claim 1, wherein:
    the torque is applied to the internal combustion engine, and thereby changes the operating point of the internal combustion engine, and
    the torque is generated by the additional drive machine and applied to the internal combustion engine when a mechanical coupling between the internal combustion engine and a drive shaft is disengaged by opening a clutch.

3. The method as recited in claim 2, wherein the additional drive machine is able to be driven by motor, and wherein the torque supports a rotational motion of the internal combustion engine.

4. The method as recited in claim 3, wherein:
    the diagnosis is carried out at least partially in a passive operation of the internal combustion engine, and
    during the passive operation:
        a mechanical clutch of the internal combustion engine to wheels of the motor vehicle is opened, and
        the additional drive machine drives the internal combustion engine.

5. The method as recited in claim 2, wherein the additional drive machine changes the operating point of the internal combustion engine in such a way that the diagnosis is able to be carried out.

6. The method as recited in claim 2, wherein, during the diagnosis, air is supplied to the internal combustion engine.

7. The method as recited in claim 2, wherein, during the diagnosis, fuel is injected into the internal combustion engine.

8. The method as recited in claim 2, wherein, during the diagnosis, a fuel/air mixture is ignited in the internal combustion engine.

9. A method for carrying out a diagnosis of an internal combustion engine of a motor vehicle, comprising:
    during the diagnosis, causing at least partially an additional drive machine to generate a torque, and thereby change an operating point of the internal combustion engine, wherein the internal combustion engine is transferred to an active mode when the diagnosis is terminated.

10. A method for carrying out a diagnosis of an internal combustion engine of a motor vehicle, comprising:
    during the diagnosis, causing at least partially an additional drive machine to generate a torque, and thereby change an operating point of the internal combustion engine, wherein the internal combustion engine is transferred to an active mode when a driver command is ascertained to start the internal combustion engine.

11. The method as recited in claim 9, wherein during the transferring of the internal combustion engine into the active mode, a driving torque, generated by the additional drive machine, is reduced in such a way that a total torque, which is transmitted by the internal combustion engine and the additional drive motor to the wheels, is constant.

12. A computer program that when executed carries out a method for carrying out a diagnosis of an internal combustion engine of a motor vehicle, the method comprising:
    during the diagnosis, causing at least partially an additional drive machine to generate a torque, and thereby change an operating point of the internal combustion engine, wherein the internal combustion engine is transferred to an active mode when a driver command is ascertained to start the internal combustion engine.

13. A non-transitory machine-readable storage medium on which a computer program is stored and that when executed carries out a method for carrying out a diagnosis of an internal combustion engine of a motor vehicle, the method comprising:
    during the diagnosis, causing at least partially an additional drive machine to generate a torque, and thereby change an operating point of the internal combustion engine, wherein the internal combustion engine is transferred to an active mode when a driver command is ascertained to start the internal combustion engine.

14. A control unit that carries out a method for carrying out a diagnosis of an internal combustion engine of a motor vehicle, the method comprising:
- during the diagnosis, causing at least partially an additional drive machine to generate a torque, and thereby change an operating point of the internal combustion engine, wherein the internal combustion engine is transferred to an active mode when a driver command is ascertained to start the internal combustion engine.

15. The method as recited in claim 2, wherein the additional drive machine includes an electric motor.

* * * * *